July 12, 1927.
D. NETTENSTROM
HYDRAULIC BRAKE
Filed June 1, 1925
1,635,383
4 Sheets-Sheet 1
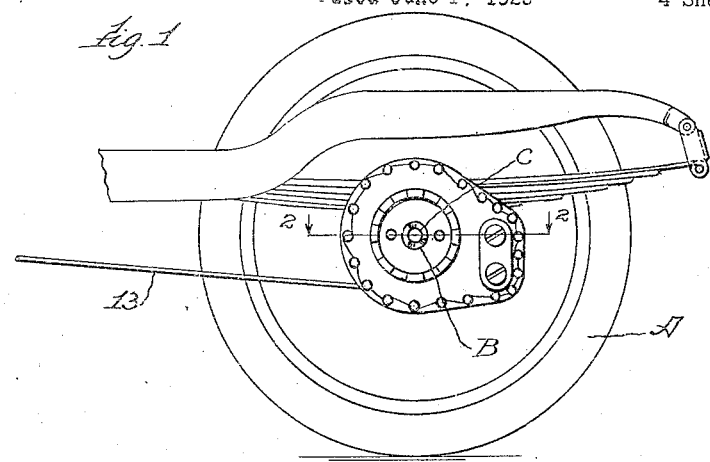
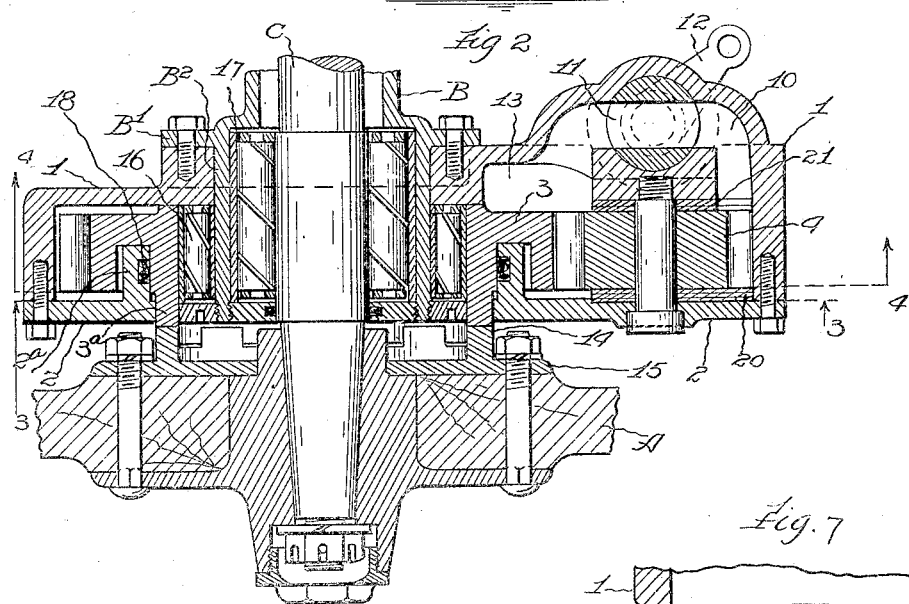
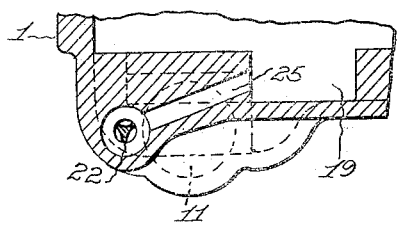
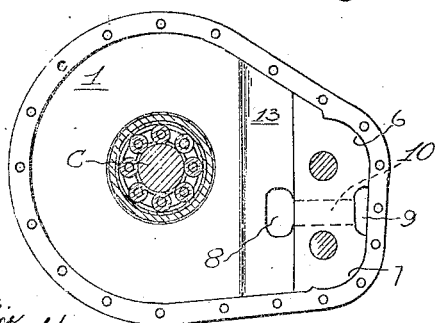
Inventor.
David Nettenstrom.
by [signature]
his Attorneys.
Witness.
[signature]

July 12, 1927.
D. NETTENSTROM
HYDRAULIC BRAKE
Filed June 1, 1925
1,635,383
4 Sheets-Sheet 2
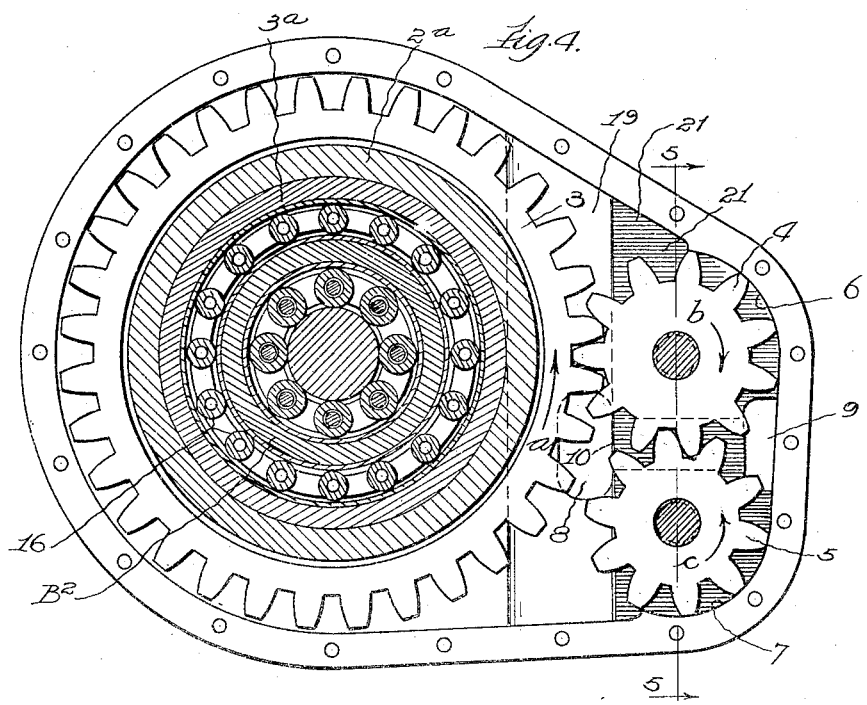
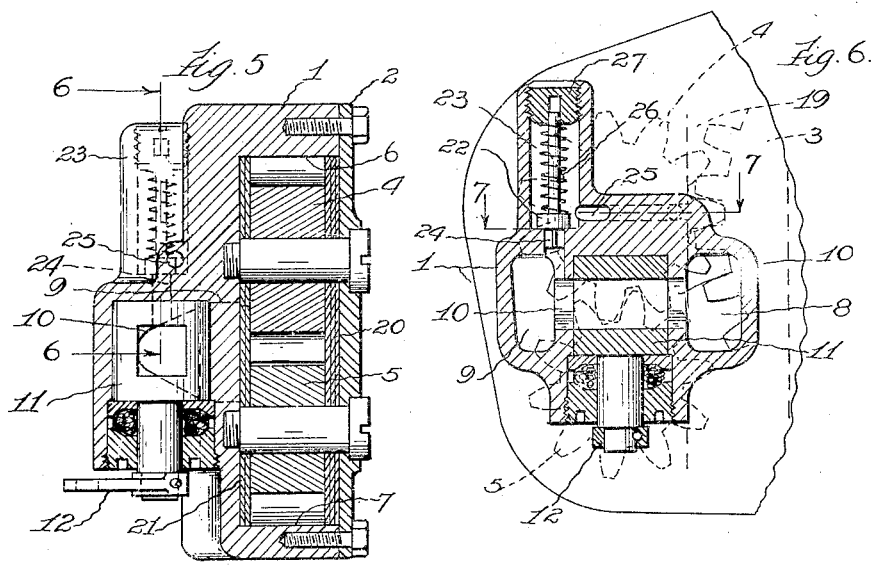
Inventor:
David Nettenstrom

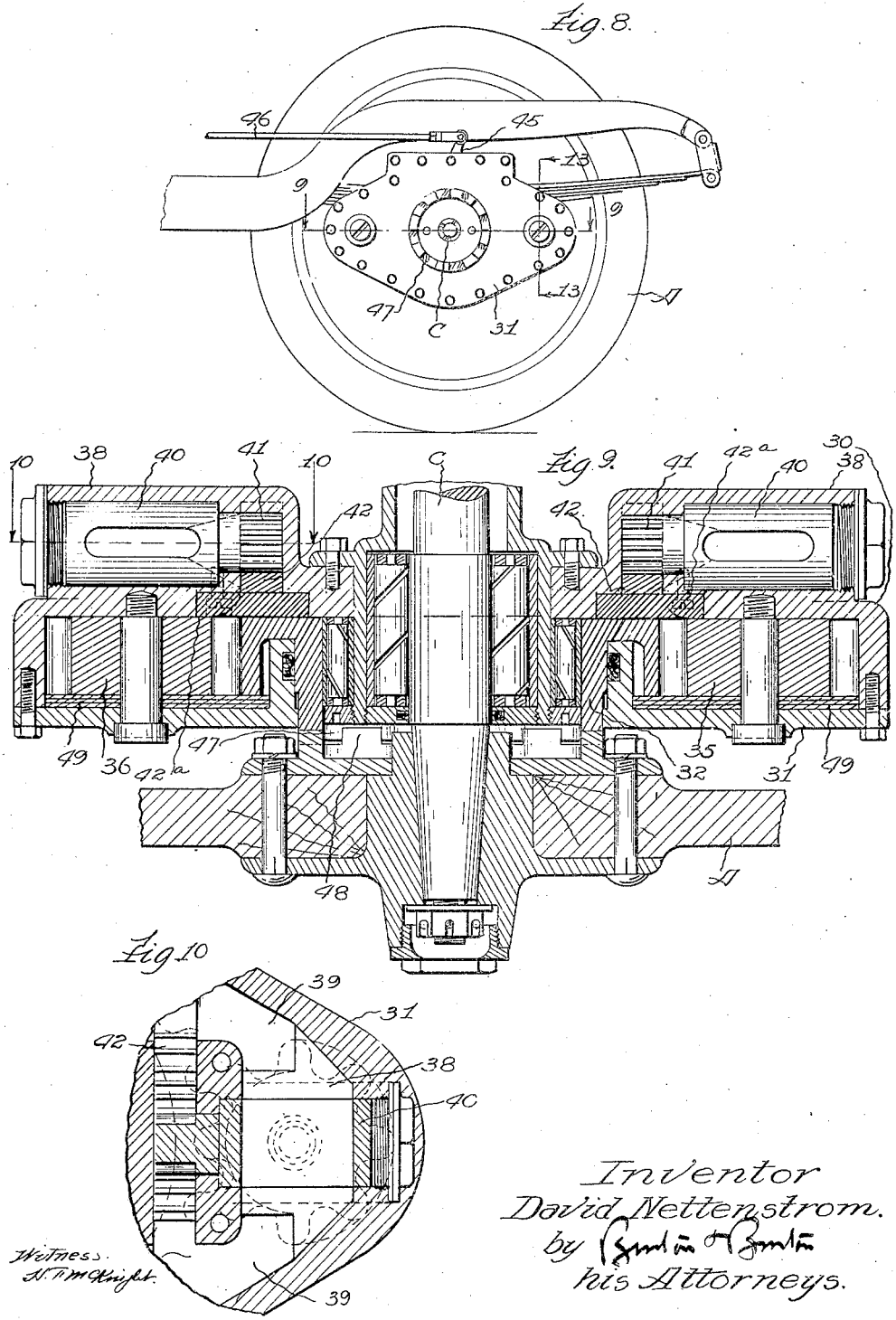

July 12, 1927.  
D. NETTENSTROM  
1,635,383  
HYDRAULIC BRAKE  
Filed June 1, 1925  
4 Sheets-Sheet 4
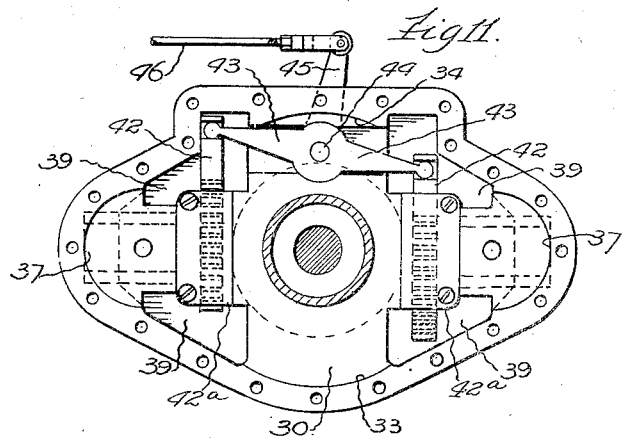
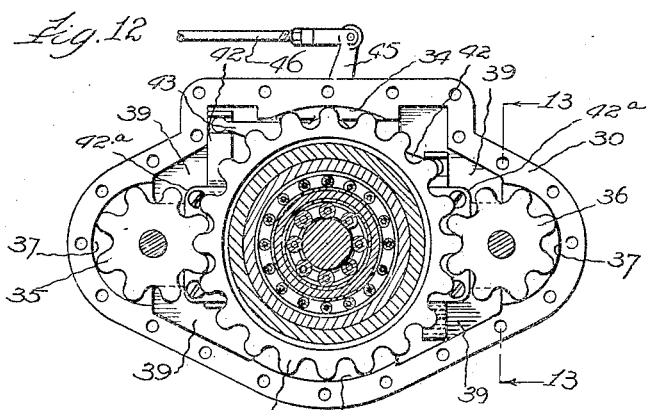
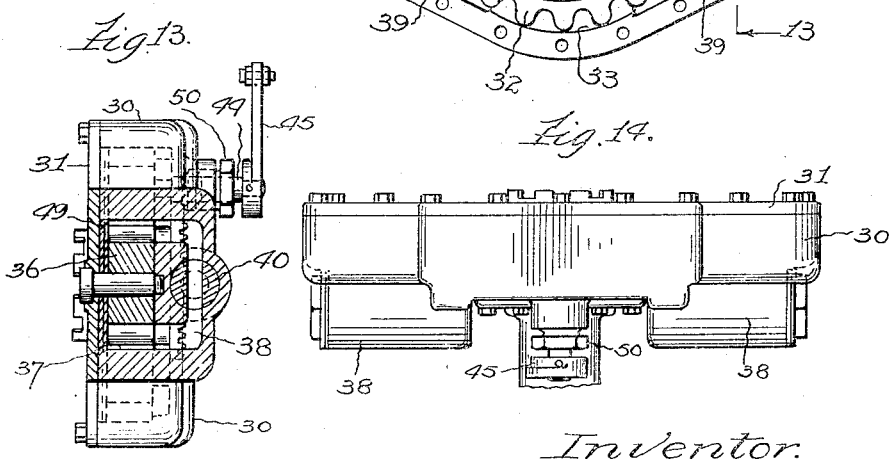
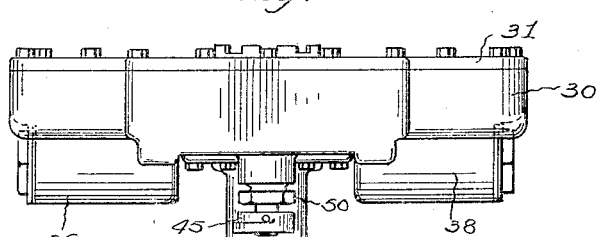
Inventor.
David Nettenstrom Patented July 12, 1927.

1,635,383

UNITED STATES PATENT OFFICE.

DAVID NETTENSTROM, OF CHICAGO, ILLINOIS.

HYDRAULIC BRAKE.

Application filed June 1, 1925. Serial No. 33,868.

The purpose of this invention is to provide an improved brake mechanism of the hydraulic type especially adapted for use on motor-driven road vehicles. It consists of certain features and elements of construction in combination as herein shown and described and as indicated by the claims.

In the drawings:—

Figure 1 is a side elevation of an automobile wheel and axle with its associated frame structure and with a brake mechanism embodying this invention applied thereto.

Figure 2 is a transverse section on a larger scale taken as indicated by line 2—2 on Figure 1.

Figure 3 is a vertical section taken as indicated at line 3—3 on Figure 2, and showing the interior of the casing with the gears removed.

Figure 4 is a vertical section taken as indicated at line 4—4 on Figure 2 showing the driving and pumping gears in operative relation.

Figure 5 is a vertical detail section taken as indicated at line 5—5 on Figure 4.

Figure 6 is a detail section taken as indicated at line 6—6 on Figure 5.

Figure 7 is a detail section taken as indicated at line 7—7 on Figure 6.

Figure 8 is an elevation of a vehicle wheel and associated parts showing a modified form of brake device applied thereto.

Figure 9 is a horizontal section taken as indicated at line 9—9 on Figure 8.

Figure 10 is a vertical detail section taken as indicated at line 10—10 on Figure 9.

Figure 11 is an inside view of the casing of the device shown on Figure 8 with the pumping gears removed, but showing the valve control devices.

Figure 12 is a view similar to Figure 11 showing the gears in operative position.

Figure 13 is an end elevation taken partly in section as indicated at line 13—13 on Figure 12.

Figure 14 is a top plan view of the device shown in Figure 8.

The brake device which is the subject of this invention is in the nature of a fluid pump of the gear type having an in-built by-pass with a control valve in the by-pass, by which the flow of liquid handled by the pump may be checked or entirely blocked at will.

By anchoring the pump casing to a non-rotating axle of the vehicle or to some other fixed portion of the running gear and connecting the moving parts of the pump with the vehicle wheel, the control of the fluid by this valve may be utilized to produce a braking effect upon the rotation of the wheel which will operate more smoothly and much more quietly than the ordinary friction brake as applied by expanding or contracting bands.

Referring to drawings, Figure 1 shows a vehicle wheel, A, with its fixed tubular axle, B, indicated in section and its drive shaft, C, carried within said axle, B, in accordance with common automobile practice. The brake device is shown more in detail in Figure 2 and comprises a casing, 1, with a cover plate, 2. The casing, 1, is anchored to a flange, B¹, of the axle, B, and carries concentrically with respect to said axle a driver gear, 3, meshing with a pinion, 4, through which a second small gear, 5, is driven. The gears, 4 and 5, constitute a gear pump, the casing wall being snugly fitted to the teeth of said gears at 6 and 7, and the lateral wall of the casing having inlet and outlet ports 8 and 9, respectively, which are connected by the by-pass, 10, formed in the cast casing, 1. Assuming that in the forward travel of the vehicle the driver gear, 3, turns with the wheel, A, in the direction of the arrow, a, on Figure 4, it will be seen that the gear, 4, will turn in the direction of the arrow, b, and the gear, 5, in opposite direction as indicated in the arrow, c. If the cavity of the casing, 1, be filled with oil or other suitable liquid, the liquid will be swept by the gears past the close-fitting portions, 6 and 7, of the casing wall to the outlet, 9, through which it will be expelled because the intermeshing teeth of the gears, 4 and 5, will prevent flow in any other direction. It may be understood that the lateral faces of the gears are flat and fit closely against the casing walls. The liquid flowing from the outlet, 9, is forced through the by-pass, 10, and returns through the inlet, 8, to the cavity of the casing, 1, to be swept around the same circuit repeatedly by the gears, 4 and 5.

A valve in the form of a simple turn-cock, 11, controls the by-pass, 10, and may be operated by any suitable linkage such as a crank arm, 12, and link, 13, extending to a foot-pedal or hand-lever (not shown) within convenient reach of the driver. When the valve is fully open as shown in Figure 2, it will not interfere with the free flow of oil or liquid around the circuit indicated, but by partially closing the valve this flow may be throttled to such an extent as to impose considerable load upon the driver gear, 3, and since this gear is directly connected to the wheel, A, this load will tend to retard the wheel. By fully closing the valve, 11, the flow of oil may be checked, except as to any slight leakage which may exist in the pump mechanism, with the result that the gear, 3, will be stopped, and the wheel, A, correspondingly arrested. For convenience the wheel, A, and gear, 3, are coupled by interengaging teeth which are formed respectively on an annular portion, 3ª, on the gear and an annular flange, 14, on the hub flange, 15, of the wheel. This tooth formation permits the wheel to be readily removed from the tapered end of the drive shaft, C, without disturbing the brake mechanism within the casing. Preferably the gear, 3, is carried on roller bearings, 16, disposed between its annular portion, 3ª, and the terminal portion, B², of the axle tube, B. Within this part, B², the usual bearings, 17, for the drive shaft, C, are located. Suitable packing material, 18, is positioned in an inwardly extending grooved flange, 2ª, of the cover plate, 2, in running contact with the annular portion of the gear, 3.

In this form of the device the gear, 3, is merely a driving gear, and is not relied upon for any pumping action; the casing, 1, is fitted around the gear, 3, with clearance and lateral clearance is provided at the point where said gear meshes with the pinion, 4, by the formation of a vertically extended channel, 19, in the casing wall, the inlet, 8, being shown opening into said channel. This also gives ample storage space for a suitable quantity of oil or liquid, so that the pumping system may be kept well filled at all times; incidentally the oil will keep the gears thoroughly lubricated, thus avoiding any rapid wear of the parts. Preferably to insure a close fit between the gears, 4 and 5, and the casing walls, I provide shim plates, 20 and 21, at opposite sides of the gears, and fitted to conform to the casing, 1, as shown in Figure 4. As the plates next to the gears wear away, they may be tightened up by the insertion of additional thin sheets back of them next to the casing walls, and may be finally replaced with new shim plates to keep the pumping parts substantially oil-tight at these surfaces.

To avoid undue shock to the mechanism if the brakes should be applied suddenly by complete closure of the valve, 11, a relief valve, 22, is mounted in a pocket, 23, in position to control a small port, 24, which leads from the by-pass, 10, at a point between the outlet, 9, and the valve, 11. The port, 24, admits the oil to the pocket, 23, and to a passage, 25, leading forward past the valve, 11, and back into the channel, 19, in the casing, 1, as indicated in Figures 5, 6 and 7. The valve, 22, is held normally seated by a spring, 26, which is stopped against a plug, 27, screwed into the end of the pocket, 23. The spring, 26, is chosen of such strength that it will yield as soon as the back pressure in the by-pass, 10, exceeds a safe value; the passage, 25, is small enough, however, so that the opening of the valve, 22, will not wholly neutralize the braking action, but will tend to prevent absolute locking of the wheel, A, or breakage of the teeth of the gears in the casing, 1.

Figures 8 to 14 show a modified form of the invention in which the casing, 30, and its cover plate, 31, are of symmetrical outline, and the gearing constitutes a pair of gear pumps. The central driver gear, 32, is closely fitted between the walls, 33 and 34, of the casing and meshes with two pinions, 35 and 36, each of which runs in close fitting engagement with a rounded end portion, 37, of the casing, 30. Thus, the driver gear, 32, and either of the pinions, 35 and 36, forms a pumping device; and for each of these pumps a by-pass, 38, is provided in the casing casting. Above and below the intermeshing teeth of the gear, 32, and each of the pinions, ports, 39, lead to the by-passes, 38, one port of each pair serving as the outlet and the other as the inlet, depending upon which direction the gear, 32, is turned by the road wheel, A, to which it is attached. Each by-pass, 38, is provided with a control valve, 40, and these valves are connected for simultaneous operation by any suitable means. The drawings show each valve fitted with a small gear or pinion, 41, which meshes with a vertically slidable rack bar, 42, whose upper end is engaged with one end of a rocker arm, 43, on a rock shaft, 44, which penetrates the casing wall and carries an operating arm, 45, outside the casing. The arm, 45, is coupled with any suitable operating mechanism (not shown) as by a link member, 46. I have not shown any relief valve applied to this form of the invention, but it may be understood that such valves might easily be provided for in substantially the same manner as in the construction previously described. The particular advantage of the modified form is that it distributes the strain over more teeth of the large gear, 32, and correspondingly reduces the unit pressure of the oil in the by-passes, 38, and throughout the casing during the application of the brake.

It may be noted that in this modified construction the central gear, 32, is interlocked with the wheel, A, by means of toothed annular members, 47 and 48, and that the gears, 35 and 36, are laterally packed by means of shim plates, 49, arranged in the same general manner as in the first described form. To prevent leakage of oil around the rock shaft, 44, any suitable form of packing gland such as that indicated at 50 may be fitted into the casing, 30.

I claim:—

1. A brake for a vehicle wheel comprising a relatively fixed fluid-tight casing, a pair of intermeshing gears journaled therein operatively connected for rotation by the vehicle wheel, the casing wall being formed with non-adjacent portions fitted snugly around segments of said gears respectively and having an inlet and an outlet separated from each other by the intermeshing teeth of the gears and connected by a passage for fluid, together with a valve controlling the flow through said passage.

2. A brake for a vehicle wheel comprising a relatively fixed fluid-tight casing, a pair of intermeshing gears snugly fitted in the casing and dividing it into two chambers, means operatively connecting said gears for rotation by the vehicle wheel, a by-pass connecting the two chambers of the casing and a control valve in the by-pass.

3. A brake device for a vehicle wheel comprising a relatively fixed fluid-tight casing, a pair of intermeshing gears journaled therein and connected for rotation by the vehicle wheel, the casing wall being formed with non-adjacent portions fitting snugly around segments of said gears respectively and having an inlet and an outlet each disposed between said non-adjacent portions with a by-pass connecting said inlet and outlet and a control valve in the by-pass.

4. In combination with a vehicle wheel and axle, a gear operatively connected to the wheel, a fluid-tight casing fixed with respect to the axle, a rotary pumping device in the casing arranged to be driven by the said gear together with fluid inlet and outlet ports in the casing and a by-pass connecting them to form a path for fluid with a control valve in the by-pass for retarding the wheel by blocking the flow therethrough.

5. A brake device comprising in combination with a vehicle wheel and a fixed axle therefor, a casing fixed with respect to said axle, a driver gear in the casing connected for rotation by the vehicle wheel, a pair of driven gears meshing with the driver at opposite sides of the latter, said casing having non-adjacent portions of its wall snugly fitted to segments of the driver gear, which segments are separated by the portions of the gear which mesh with the driven gears; said casing being also fitted snugly around segments of the driven gears whereby each of said driven gears co-operates with the driver to form a fluid pump, inlets and outlets in the casing for said pumps and valve means for controlling the movement of fluid through said pumps.

6. In the combination defined in claim 5, passages formed in the casing providing a closed circuit for the fluid handled by said pumps, said valve means controlling the flow through said passages.

7. In the combination defined in claim 5, inlet and outlet ports being formed in the casing at respectively opposite sides of the intermeshing portions of the gears whereby said intermeshing portions form a partition between the inlet and outlet of each pump, a by-pass formed in the casing connecting the inlet and outlet of each pump and valve means controlling said by-passes.

8. In the combination defined in claim 7, said valve means comprising separate valve members for the by-passes and inter-connected operating means for said valve members arranged to move them simultaneously for closing or opening both valves together.

9. In the combination defined in claim 1, said gears having flat faces and flat shim plates disposed against the flat faces of the gears in contact with the segments to which the casing is snugly fitted.

10. A brake device comprising in combination with a vehicle wheel and a fixed axle therefor, a gear pump having its casing fixed with respect to the axle, a gear in the casing concentric with the vehicle wheel and formed with an annular toothed portion extending from the casing toward the wheel, said wheel having an intermembering toothed portion to provide a driving engagement for said gear, the casing being provided with an outlet and an inlet for the fluid with a by-pass connecting them and forming a closed passage for fluid handled by the pump, together with a control valve in the passage for reducing or blocking said flow.

11. In the combination defined in claim 5, the driver gear being co-axial with the vehicle wheel and having an annular portion extending through the casing toward the wheel, means on the wheel engaging said annular portion of the gear and packing means around the annular portion in the casing.

12. A brake device comprising in combination with a vehicle wheel and a fixed axle therefor, a fluid-tight casing fixed with respect to the axle, a rotary pumping device in the casing having a driving member concentric with the wheel, said driving member including an annular portion extending through the casing toward the wheel, means on the wheel engaging said annular portion and packing means between said annular portion and the casing for keeping the casing fluid tight.

DAVID NETTENSTROM.